(12) United States Patent
Drexler et al.

(10) Patent No.: US 7,613,023 B2
(45) Date of Patent: Nov. 3, 2009

(54) MEMORY ARRANGEMENT, PARTICULARLY FOR THE NON-VOLATILE STORAGE OF UNCOMPRESSED VIDEO AND/OR AUDIO DATA

(75) Inventors: Michael Drexler, Gehrden (DE); Axel Kochale, Springe (DE); Jens Peter Wittenburg, Isernhagen (DE)

(73) Assignee: Thomson Licensing, Boulogne Billancourt (FR)

( * ) Notice: Subject to any disclaimer, the term of this patent is extended or adjusted under 35 U.S.C. 154(b) by 195 days.

(21) Appl. No.: 11/887,869

(22) PCT Filed: Feb. 21, 2006

(86) PCT No.: PCT/EP2006/060137

§ 371 (c)(1),
(2), (4) Date: Oct. 4, 2007

(87) PCT Pub. No.: WO2006/108732

PCT Pub. Date: Oct. 19, 2006

(65) Prior Publication Data

US 2009/0010059 A1 Jan. 8, 2009

(30) Foreign Application Priority Data

Apr. 11, 2005 (DE) .................. 10 2005 016 684

(51) Int. Cl.
*G11C 5/06* (2006.01)
(52) U.S. Cl. ................ 365/63; 365/189.02; 365/230.02
(58) Field of Classification Search .................. 365/63, 365/189.02, 230.02
See application file for complete search history.

(56) References Cited

U.S. PATENT DOCUMENTS 4,694,394 A 9/1987 Costantini
5,822,251 A 10/1998 Bruce et al.
7,463,544 B1* 12/2008 Jefferson ................ 365/230.02

(Continued)

FOREIGN PATENT DOCUMENTS

WO WO 99/30240 6/1999

OTHER PUBLICATIONS

Search Report Dated May 30, 2006.

*Primary Examiner*—Son Dinh
*Assistant Examiner*—Nam Nguyen
(74) *Attorney, Agent, or Firm*—Robert D. Shedd; Jeffrey M. Navon

(57) ABSTRACT

When recording uncompressed video and/or audio data using a digital video recorder, there is the need for a robust memory arrangement based on non-volatile, integrated circuits which is able to be fitted directly on the video camera without a long external cable connection and which is also able to be used for shots under difficult conditions, particularly action shots. The inventive memory arrangement involves the use of a number of non-volatile memory chips which are connected together with a favorable level of circuit complexity. To be able to cope with the high data rate for the incoming video and/or audio data, a plurality of parallel supply buses are provided. Each supply bus has an associated number of memory chips. In this case, the memory word length of the memory chips is greater than the bus width of a data/address bus. A supply bus with high-quality multiplexing has a respective associated number of demultiplexer/driver circuits which match the bus width of the supply bus to the memory word length of the memory chips. There are respectively as many downstream memory chips per demultiplexer/driver circuit as prescribed by a value X, the value X being limited by the memory technology used, namely by the maximum number of circuits which can be connected, also called the "fan-out" value. The memory chips used are preferably NAND Flash EPROM memory chips.

9 Claims, 2 Drawing Sheets

U.S. PATENT DOCUMENTS

Figure 1:
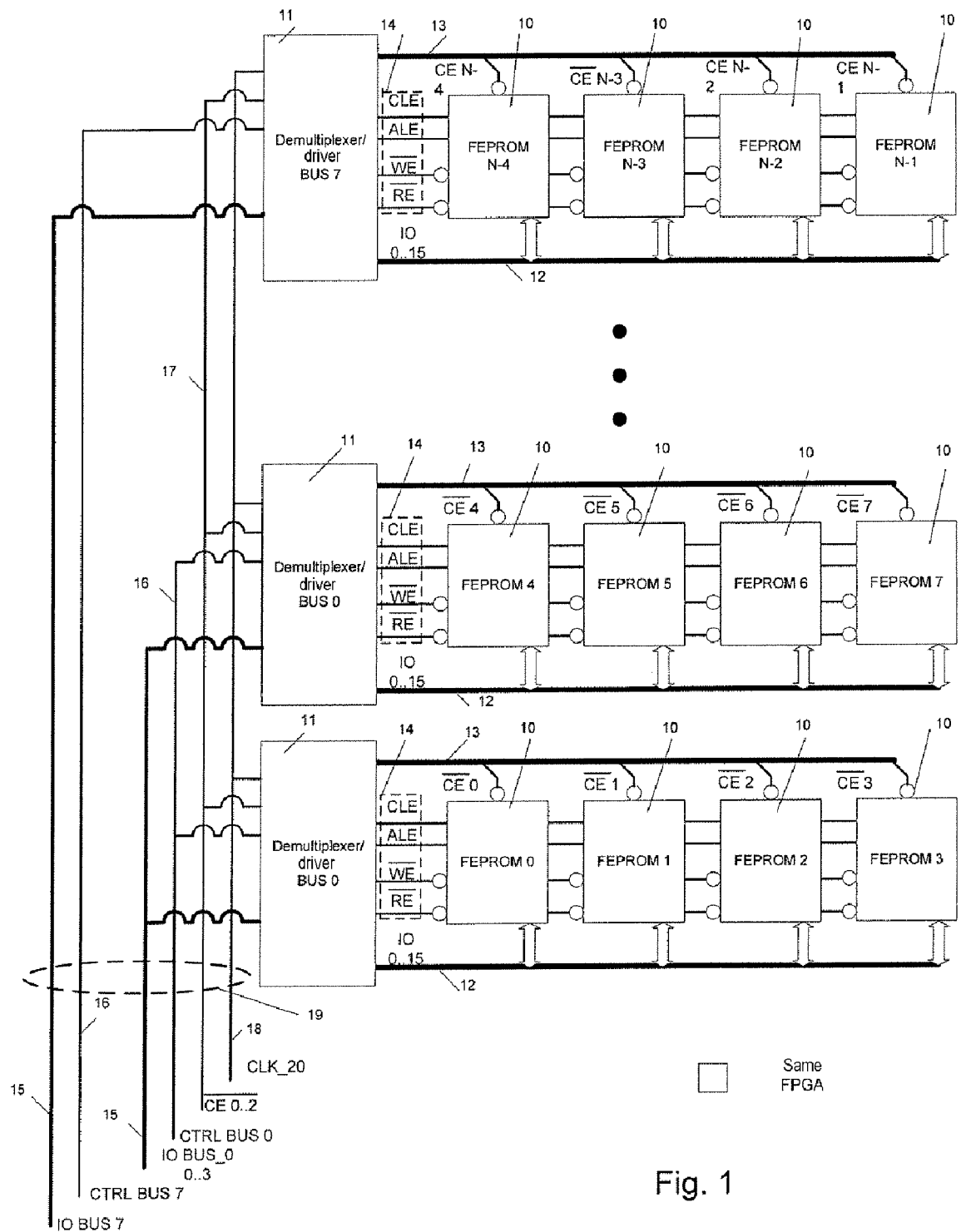

2003/0163606 A1    8/2003    Fukaishi et al.
2004/0256638 A1    12/2004   Perego et al.

* cited by examiner

MEMORY ARRANGEMENT, PARTICULARLY FOR THE NON-VOLATILE STORAGE OF UNCOMPRESSED VIDEO AND/OR AUDIO DATA

This application claims the benefit, under 35 U.S.C. § 365 of International Application PCT/EP2006/060137, filed Feb. 21, 2006, which was published in accordance with PCT Article 21(2) on Oct. 19, 2006 in English and which claims the benefit of German patent application No. 102005016684.9, filed Apr. 11, 2005.

BACKGROUND TO THE INVENTION

During film production in a digital studio, uncompressed video and/or audio data need to be stored reliably. This is currently done using magnetic recording systems, such as video tapes or hard disks. In these cases, however, the data delivered by a digital camera are routed to the recording equipment via a cable connected to the camera. Appropriate high-speed bus systems are available for this. Examples which may be mentioned are the HD-SDI bus and the various types of X-Gigabit Ethernet technology. However, this form of data recording has the drawback that, as mentioned, a long cable needs to be attached to the camera and this cable decouples the pickup location, that is to say the camera, and the recording location, that is to say the data recorder, from one another. This has the obvious drawback that the cable attached to the camera is not just unwieldy at the recording location but rather is also a disturbance in many cases. In the case of film scenes to be recorded in which the camera needs to be moved over relatively long distances, this method of recording has limitations or even becomes impossible. For this reason, such film shots are often still recorded photochemically on the classical roll of film today.

It is an aim of the invention to provide a novel memory arrangement which allows the uncompressed video and/or audio data to be stored directly at the pickup location in vibration-proof fashion without requiring a relatively long external cable connection between the camera and the memory arrangement.

INVENTION

To be able to store data in a vibration-proof and non-volatile fashion, it is appropriate to construct a memory arrangement based on the large-scale integrated Flash memory chips, that is to say Flash EPROM. Such memory chips are available from the manufacturers Samsung, Toshiba, Sandisk and Micron, for example, in two different configurations: firstly with a memory word length of 8 bits and secondly with a memory word length of 16 bits. The very large-scale integrated Flash memory chips which can be obtained at present have a capacity of 2 or 4 Gbit. First trials with storage capacities of 8 Gbit of data by the manufacturers Toshiba and Sandisk have been successful. In this context, there are fundamentally two different types of FEPROMs. Firstly, there are FEPROMs, which are constructed using NOR gates. These have relatively long write and erase cycles but allow random access to the individual memory words.

Secondly, there are FEPROMs, which are constructed using NAND gates. It is possible to write to and erase these at a higher speed and they have higher storage densities, which means that they are better suited to the purpose of storing uncompressed video and/or audio data. A common feature of both types is that they are divided up into memory pages. Normally, the memory is divided up into pages of 1024 memory words for the useful data plus 32 memory words for the error correction per page. However, NAND FEPROMs have the drawback that the maximum possible number of memory chips connected in series is greatly limited with this technology. Only four such memory chips can be operated on the same physical bus. In addition, there is the demand on the memory arrangement that it needs to cope with a very high data rate during the recording for the case of uncompressed video data. Today, many video recordings need to be made at HD resolution. At a resolution of 1920 times 1080 pixels per video frame and a frame rate of 24 frames per second at full color resolution with 10-bit video data, this means a data stream of 2 Gbit/s. Data compression is not acceptable in film production, which means that the data rate is firmly prescribed.

The inventive memory arrangement meets all of the aforementioned demands and is optimized in terms of circuit design. To be able to cope with the high data rate, a plurality of multiplexed supply buses are arranged in parallel. A supply bus (also called a logical bus) has an associated number of demultiplexers with associated memory chips, in order to relieve the load on the bus properly. In this case, a respective particular number of memory chips are connected in series, this number being limited by the fan-out value of the NAND Flash memory technology. Each memory interconnection has an upstream demultiplexer which compiles the fractions of a memory word which arise at a high clock rate at the input and forwards them to the associated memory chips.

The inventive circuit design has the advantage that the board layout can be used both for the 16-bit-orientation NAND Flash chips available on the market and for the widespread 8-bit-orientation NAND Flash memory chips available on the market.

The interface defined in this way for the memory arrangement is of transparent design, so that it is even possible to construct memory systems in which boards with 16-bit Flash memory chips can be mixed with boards with 8-bit memory chips.

The measures presented in the dependent claims permit advantageous developments of the invention. It is very advantageous if the demultiplexers are arranged in a number of user-programmable logic circuits, that is to say FPGA chips. FPGA chips can be used inexpensively in the circuit design.

For one specific implementation of a memory arrangement, a favourable arrangement with 64 memory chips is obtained, one demultiplexer being provided for four respective memory chips connected in series, and two respective demultiplexers being allocated per supply bus. This then results in eight parallel supply buses which supply the data to the memory arrangement. By interconnecting a plurality of such memory arrangements, it is possible to increase the recording time within the context of the available space in the housing.

DRAWINGS

Exemplary embodiments of the invention are illustrated in the drawings and are explained in more detail in the description below.

Figure 2:
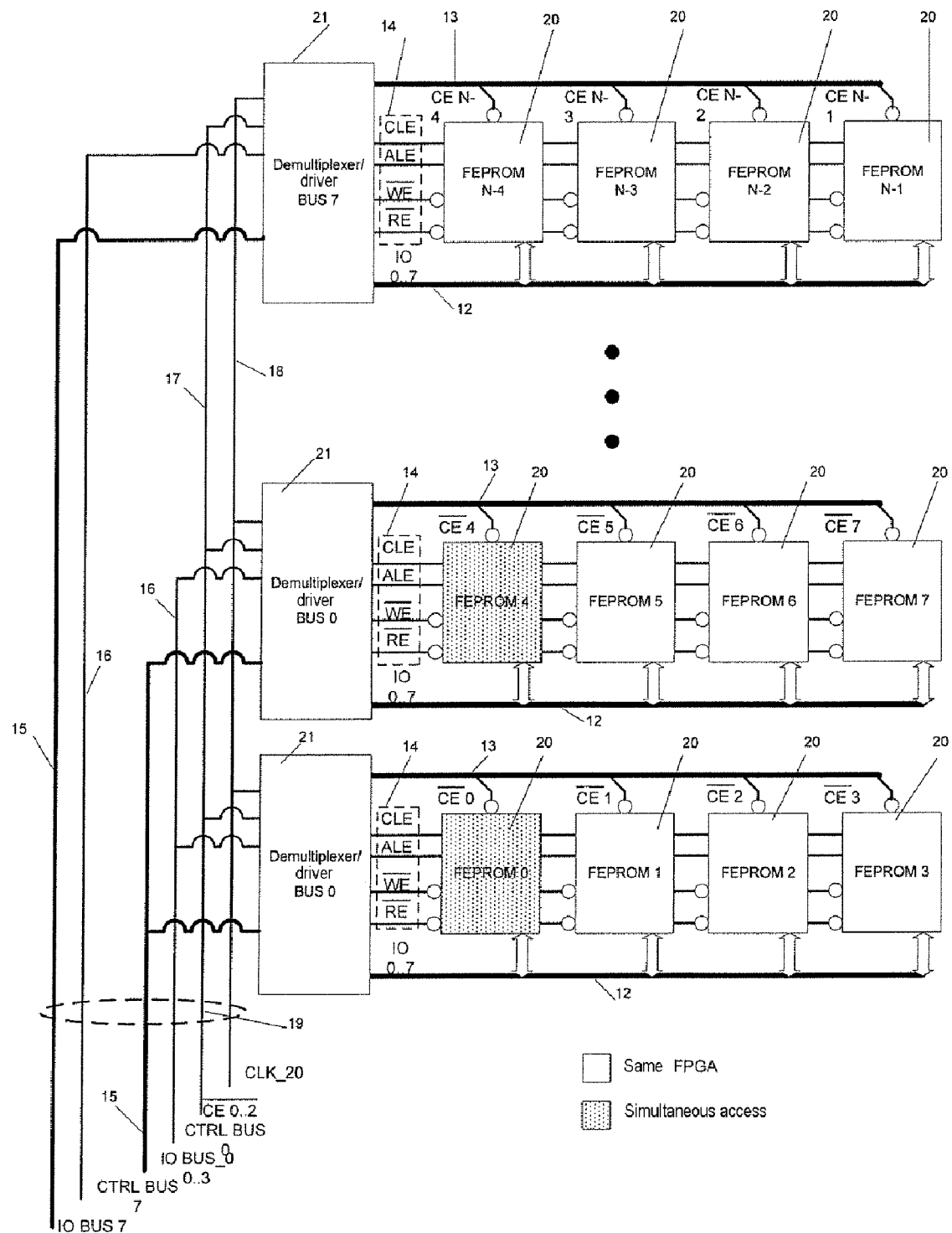

In the drawings:

FIG. 1 shows the inventive memory arrangement with 16-bit NAND Flash memory chips; and FIG. 2 shows the inventive memory arrangement with 8-bit NAND Flash memory chips.

EXEMPLARY EMBODIMENTS OF THE INVENTION

In FIG. 1, the reference numeral 10 denotes the memory chip. The case shown is the 2-Gbit Flash memory chip from the manufacturer Samsung, with the type designation K9K2G16x0M or K9K2G16U0M-YCB000. This is a 16-bit-orientation Flash memory chip. Four respective instances of these memory chips are arranged in series and are connected to a demultiplexer/driver chip 11 via associated data/address/control buses 12, 13 and 14. The demultiplexer/driver chip 11, for its part, is supplied with data via connected buses 15, 16, 17. The clock is supplied via a clock line 18. The bus with the reference numeral 15 is a 4-bit supply bus which uses high-quality multiplexing and which is used to transmit the address in one phase and the data to be written or to be read in the other phase. To be able to write a 16-bit memory word to the memory chip 11, four nibbles therefore need to be delivered to the demultiplexer 11 via the associated supply bus 15. The control line 16 selects between the respective two demultiplexer/driver chips 11 associated with the bus 15. The bus 17 is used to transmit three bits of the address used to select one of the 8 memory chips which are associated with the supply bus 15. Whereas the supply bus 15 is clocked at 80 MHz, the physical buses 12 connected directly to the memory chips are clocked at only 20 MHz on account of their 16-bit width. As described, only one of the eight associated memory chips 10 is written in a bus cycle of the supply bus 15. However, since a total of eight such supply buses are arranged in parallel, as shown, with a respective further eight memory chips, eight memory chips have information written to them simultaneously in a write cycle. A grey background to the demultiplexer/driver chips 11 indicates that the two demultiplexer/driver chips 11 provided for the supply bus with the number 0 are accommodated in one and the same FPGA chip.

In FIG. 2, the same reference numerals as in FIG. 1 denote the same components. The explanation of these components is therefore not repeated again. In the exemplary embodiment shown in FIG. 2, the widespread 8-bit-orientation Flash memory chips 20 are used. The manufacturer Samsung supplies such a memory chip with a storage capacity of 4 Gbit under the designation K9W4G08U0M-YCB000.

The physical bus 12 for this memory chip type may have a width of 16 bits, but only 8 lines of these are actually contact-connected in order to supply the memory chip 20 with data. Accordingly, the demultiplexer/driver chips 21 are designed such that they apply 8-bit words to the data/address bus 12 in a read/write cycle. In addition, the 4 nibbles of a bus cycle on the supply bus 15 are split over two different demultiplexer/driver chips 21, which is indicated by a grey background. In the associated write cycle, two memory chips 20 are then simultaneously active, which is likewise indicated by a grey background. The board layout and the interface 19 of the board are identical in both exemplary embodiments, as shown.

To ensure the reliability of the data transmission at the high clock rates, it is advantageous if all the signal transmissions via the interface 19 are implemented in an LVDS (Low Voltage Differential System).

The invention claimed is:

1. Memory arrangement having a number of N memory chips, where a respective particular number of memory chips are connected to a supply bus in order to relieve the load on the bus, the supply bus being multiplexed, wherein an integer multiple of the width of the supply bus corresponds to the word length of the memory chips, in that a number of demultiplexers per supply bus are provided which match the bus width to the word length of the memory chips, with a respective demultiplexer respectively having as many downstream memory chips as prescribed by a value X, the value X being limited by the memory technology used, namely by the maximum number of circuits which can be connected, also called fan-out.

2. Memory arrangement according to claim 1, where the values N and X are chosen such that an integer number of parallel supply buses with the same coverage of memory chips is produced.

3. Memory arrangement according to claim 1, where the word length of the memory chips is 8 or 16 bits.

4. Memory arrangement according to claim 1, where the memory chips relate to non-volatile memory chips.

5. Memory arrangement according to claim 4, where the memory chips are of the FEPROM, that is to say Flash EPROM, type, particularly constructed using NAND gates.

6. Memory arrangement according to claim 1, where the bus width of the supply bus corresponds to a width of 4 bits.

7. Memory arrangement according to claim 1, where the demultiplexers are implemented using a number of FPGA chips.

8. Memory arrangement according to claim 2, where the number N is equal to 64 and the number X is equal to 4, with two respective demultiplexers per supply bus being provided.

9. Use of the memory arrangement according to claim 1 for recording uncompressed video and/or audio data.

* * * * *